Jan. 13, 1942.  S. T. CARTER  2,269,870
LABELING MECHANISM
Filed Jan. 19, 1940  6 Sheets-Sheet 1

INVENTOR.
Sidney T. Carter
BY
ATTORNEYS

Jan. 13, 1942. S. T. CARTER 2,269,870
LABELING MECHANISM
Filed Jan. 19, 1940 6 Sheets-Sheet 2

INVENTOR.
Sidney T. Carter
BY
ATTORNEYS

Jan. 13, 1942.   S. T. CARTER   2,269,870
LABELING MECHANISM
Filed Jan. 19, 1940   6 Sheets-Sheet 3

INVENTOR.
Sidney T. Carter
BY
Hock & Blum
ATTORNEYS

Jan. 13, 1942.  S. T. CARTER  2,269,870
LABELING MECHANISM
Filed Jan. 19, 1940  6 Sheets-Sheet 4

INVENTOR.
Sidney T. Carter
BY
Mock & Blum
ATTORNEYS

Jan. 13, 1942.  S. T. CARTER  2,269,870
LABELING MECHANISM
Filed Jan. 19, 1940  6 Sheets-Sheet 5

INVENTOR.
Sidney T. Carter
BY
Mocks Blum
ATTORNEYS

Jan. 13, 1942.   S. T. CARTER   2,269,870
LABELING MECHANISM
Filed Jan. 19, 1940   6 Sheets-Sheet 6

INVENTOR.
Sidney T. Carter
BY
ATTORNEYS

Patented Jan. 13, 1942

2,269,870

UNITED STATES PATENT OFFICE 2,269,870

LABELING MECHANISM

Sidney T. Carter, New Kensington, Pa., assignor to Schenley Distillers Corporation, New York, N. Y., a corporation of Delaware Application January 19, 1940, Serial No. 314,595

5 Claims. (Cl. 91—18)

My invention relates to a new and improved mechanism for labeling bottles and other containers.

One of the objects of the invention is to provide means for applying glue or other adhesive to substantially the entire label, so as to apply said adhesive to parts of the label which are not supplied with adhesive by the present conventional type of equipment.

Another object of the invention is to connect the edges of a pack of labels by relatively weak means and then separate the labels from said pack, one by one, and to apply the separated labels to the bottle or other container. Said connecting means may be adhesive, but other means can be used.

Another object of the invention is to provide an attachment or part of a labeling machine which machine may be otherwise of conventional construction. Without limiting the invention to any conventional labeling machine, my invention can be utilized in connection with the type of labeling machine which is shown in U. S. Patents No. 1,622,381, and No. 1,901,101.

Another object of the invention is to provide a mechanism which will eliminate the use of prongs for supporting the labels in the label box.

Other objects of the invention will be stated in the following description and drawings which illustrate preferred embodiments thereof.

Fig. 4 also shows certain associated parts.

The conventional labeling machine does not apply glue to all parts of the label. The ordinary labeling machine fails to apply adhesive to approximately seven spaced areas of the label. Due to the construction of the conventional label box and the construction of the conventional pickers, it is necessary to supply the label box with supporting prongs which have hook-points. Since these points extend under the bottom of the label pack, it is necessary to cut corresponding slots in the pickers, in order to provide proper clearance and in order to enable the pickers to contact with the bottom label of the pack. Since the pickers transfer glue from the faces of said pickers to the label by contact, the label only receives glue on that area which corresponds to the unslotted faces of the pickers.

The presence of these numerous unglued areas on the label is objectionable in certain types of bottles. This applies particularly to the horizontal areas on the vertical edges of the label, in those bottles where the label is applied to a curved surface. Any section of the label which is not fastened to the bottle by glue will stretch and cause a bulge when the label absorbs moisture by a change in temperature or relative humidity in the air. These bulges are very pronounced on those labels which are applied to curved bottles. The bulge is always parallel to the unglued area. If the section of the label which has the unglued area is fastened to the curved face of the bottle, the resultant double curve of the label is very pronounced and this spoils the appearance of the package. It is not so important to apply glue continuously at the top and the bottom of the label, because, as a rule, that part of the bottle is planar. Even if this part of the bottle is slightly curved, the presence of unglude areas at the top and bottom of the label are not substantially objectionable.

According to my invention, I eliminate the horizontal unglued areas at or adjacent the vertical edges of the label.

Figures 1, 2:
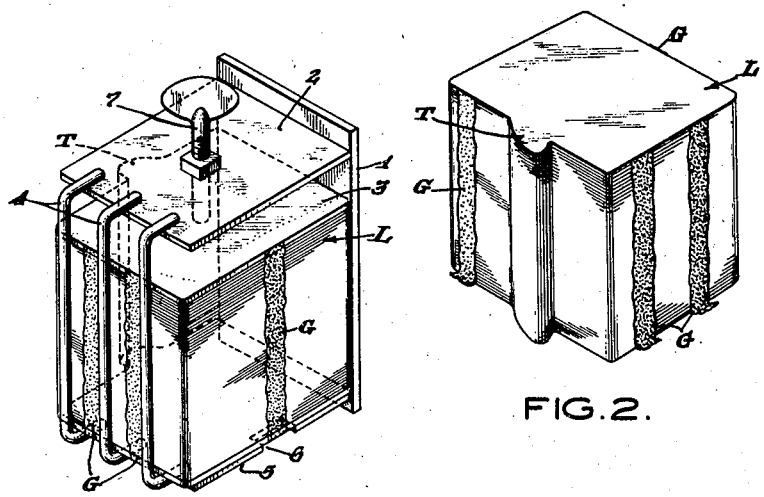
Fig. 1 is a perspective view of a holder in which the labels of a pack are connected to each other at the edges of said labels, prior to using the labels in the labeling machine.
Fig. 2 is a perspective view of the prepared pack of labels, detached from the holder which is shown in Fig. 1.

As shown in Figs. 1 and 2, prior to using the labels in the labeling machine, said labels are prepared in stacks or packs, each of which can contain any suitable number of labels, such as one thousand. The holder which is shown in Fig. 1 has a rigid wall 1 which may be made of metal or other suitable material. A plate 2 is fixed to this wall 1. A follower plate 3, which can be made of cardboard or other suitable material, is located at the top of the stack of labels. The labels rest upon a bottom plate 5, which is fixed to the wall 1.

Spaced and rigid rods 4 are connected to the plates 2 and 5. The positions of these rods 4 correspond to the prongs of the label box so that said rods will indicate the proper position for applying thin vertical layers of glue G to the edges of the labels. The bottom plate 5 is provided with a pair of opposed slots 6, one of which is shown in Fig. 1. A cardboard sheet can be located between the bottom of the pack of labels and the supporting plate 5. Pressure can be applied to the pack of labels, by means of the thumb screw 7, which passes through a tapped opening in the fixed plate 2. Narrow stripes of glue or other adhesive G are thus applied to three of the faces of the stack of labels. The labels which are located in this gluing box are preferably located upside down.

After the glue has dried and set, the pack of labels can be removed from the holder and the cardboard sheets at the top and bottom of the pack of labels can be easily cut away. The thin stripes of glue can be applied along the sides of the pack of labels, while the pack is held under pressure by the thumb-screw 7.

If desired, drops of the glue can be applied at the top of the pack, at the points corresponding to the vertical stripes G, after pressure has been applied upon the top cardboard sheet 3, by means of the thumb-screw 7. The glue can then run down by gravity along the three sides of the pack of labels. The pack of labels is held vertical while the liquid glue is applied, and until the liquid glue has set, so that each label is in a horizontal plane during the operation. This controls the thickness of the stripes of glue, and it permits the operator to apply the stripes of glue G to the three sides of the pack of labels before the glue dries. If a heavy coating of glue is required, a heavy-bodied glue is used, and vice versa.

The adhesion between the individual labels and the adhesive which is applied to the pickers is sufficiently great to enable the labels to be separated, one by one, from this pre-glued pack. The pickers are introduced at the bottom of the pack of labels, at the vertical wall of the pack which is free from the stripes of adhesive. As each label is removed from the pickers, the adhesive of the stripes G rolls up at two of the sides of the pack of labels. At the other side or upstanding wall of the pack of labels, the stripes of adhesive hang below the bottom wall of the pack of labels. In the labeling machine, the longitudinal axis of the pack of labels is held at an angle of about 65° to the vertical axis, so that the bottom flat label makes an angle of 25° with the horizontal plane. This gives clearance so that the strips of glue at the rear wall of the pack of labels can hang down, free from the mechanism.

As a pack of labels which has thus been prepared is used, an additional pack or packs are added to the top of the pack which is being used. The additional pack or packs can be connected to each other, by means of a quick-drying glue. This permits continuous operation of the machine.

I can use any type of liquid book-binding glue, but I prefer to use a flexible adhesive, such as latex or the like. I prefer to use a flexible adhesive, in order to allow the pack of labels to move freely and also to allow for variations, because brittle glue has a tendency to crack and to allow the labels to separate. Since the glue or adhesive is applied at three sides of the pack of labels while said labels are pressed together under substantial pressure, the glue or adhesive adheres only to the edges of the pack of labels. As the labels are picked one by one from the pack, there are no marks on the label which can be noticed on the bottle or container.

The adhesive which is thus applied to three sides or walls of the pack of labels, only acts to maintain the pack as a unit, so that the pack can be suitably controlled in the label box. When the pickers open, any slight variation in the glue on the surfaces of the pickers which are removing the bottom label would cause the bottom label to slip to one side with one of the pickers. By connecting the pack of labels so as to form a single unit, each label is automatically held in position until the pickers pull the bottom or end label away from the pack.

As shown in Fig. 2, each label L may be provided with a tab T at one face thereof.

Figure 7:
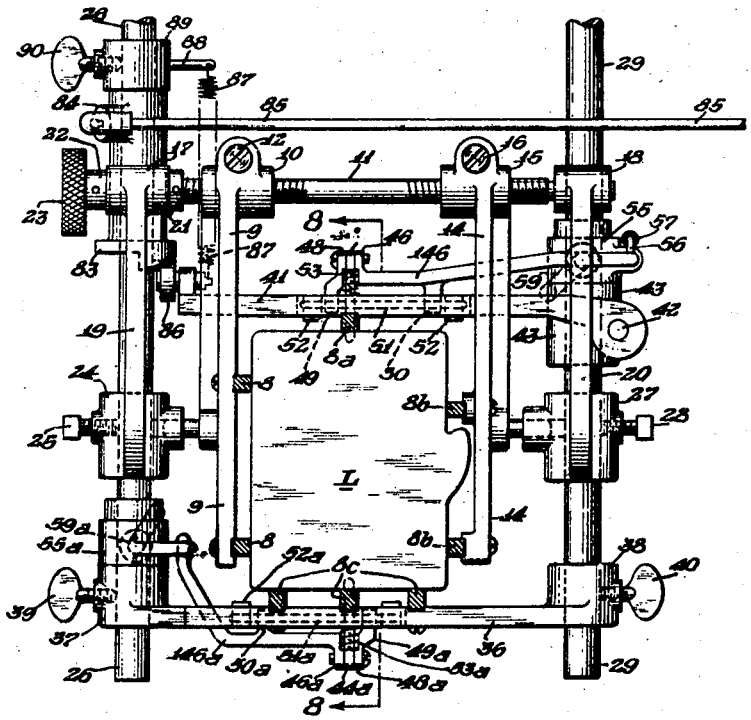
Fig. 7 is a plan view, partially in section, on the line 7—7 of Fig. 6.

Referring to Fig. 7, the label holder in the machine, to which the pack of labels is transferred, comprises spaced bars 8, 8a, 8b and 8c. The bars 8 are connected to a supporting bar 9. This supporting bar 9 has a hub 10 which is provided with an interior thread. The hub 10 is a split hub and it is tightened by the screw 12, so that the interior thread of the hub 10 engages with the corresponding outer thread of the adjusting member 11. The bars 8b are connected to a second supporting bar 14, whose hub 15 and screw 16 correspond to the hub 10 and the screw 12.

The interior threads of the hubs 10 and 15 are respectively left-hand and right-hand, and the corresponding threads of the member 11 are also left-hand and right-hand.

Hence, when the adjusting member 11 is turned, the hubs 10 and 15 are moved towards each other or away from each other.

The adjusting shaft 11 is journalled in bearings 17 and 18 which are respectively integral with arms 19 and 20. A collar 21 is suitably clamped or connected to the member 11 at one side of the bearing 17. A hub 22 of a knurled head 23 is also clamped or connected to the member 11. The member 11 is thus prevented from shifting longitudinally relative to the bearings 17 and 18.

The arm 19 is integral with a hub 24 which is adjustably clamped to a rod 26 by means of a set screw 25.

The arm 20 also has an integral hub 27 which is adjustably clamped by means of a set screw 28 to the rod 29. The rods 26 and 29 respectively pass through the hubs 24 and 27.

The rods 26 and 29 are connected in the same manner to the frame F of the machine.

Figure 6:
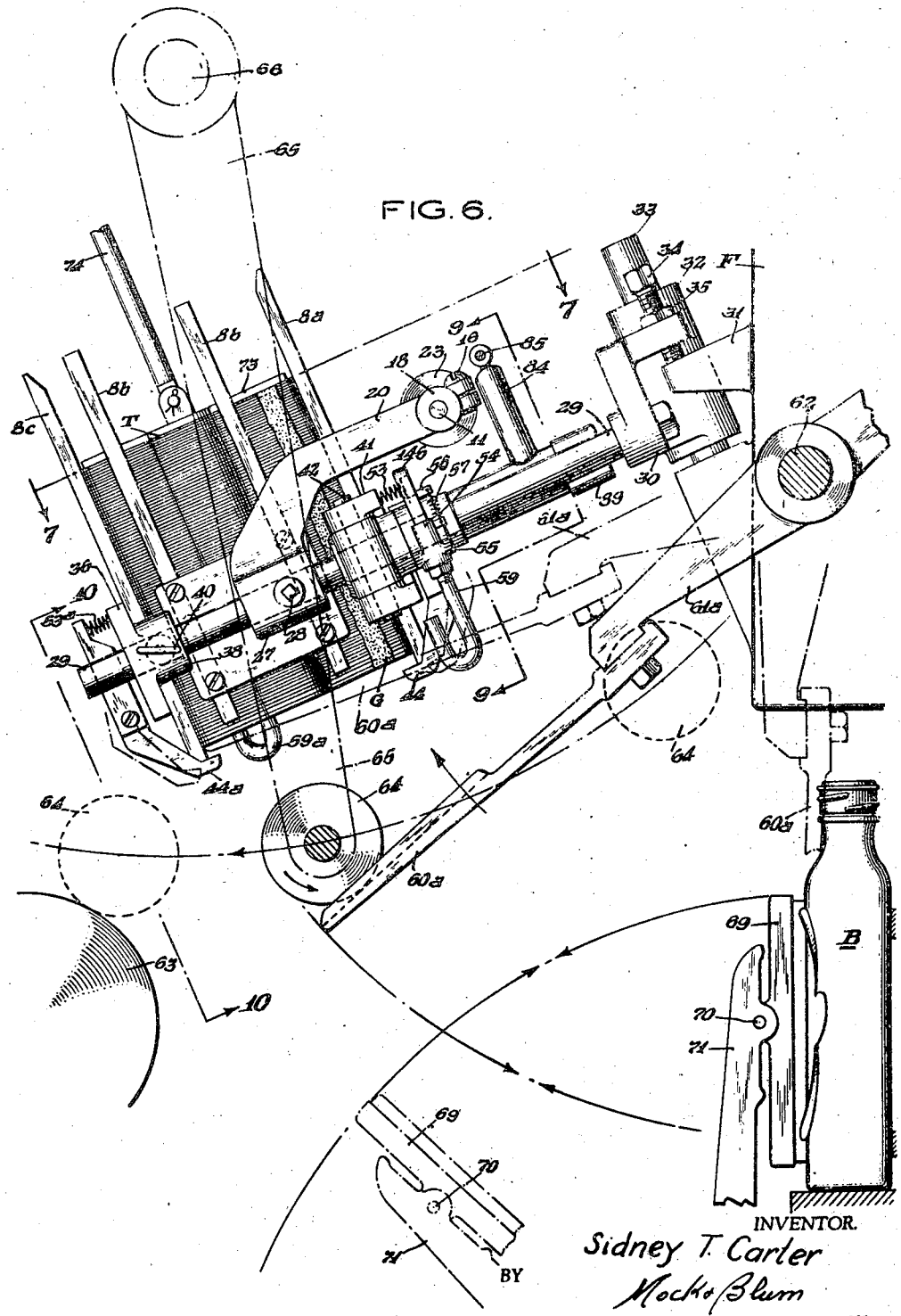
Fig. 6 is an enlarged detail side elevation showing the holder for the pack of labels, the essential mechanism associated with said holder, and the picker mechanism for removing the labels from the holder, one by one.

As shown in Fig. 6, one end of the rod 29 is held in the bore of a casting 30, which has an angular shape. The frame F has an arm 31. The casting 30 is integral with a hub 32. A rod 33 passes through said hub 32. Said rod 33 is integral with the frame F, or it is suitably connected to the frame F. The hub 32 can be adjusted on the rod 33, by means of the adjusting screw 34, whose tip abuts the member 31. A lock-nut 35 maintains the hub 32 in the desired adjusted position.

The arms 8c are connected to a supporting arm 36 which has integral hubs 37 and 38. The rods 26 and 29 pass respectively through said hubs 37 and 38. Set screws 39 and 40 respectively clamp the hubs 37 and 38, in suitable adjusted position, to the respective rods 26 and 29.

The rod 8a is connected to a supporting arm 41 which is connected by a pivot pin 42 to a collar 43 which is held adjustably on the rod 29. The collar 43 is clamped to the rod 29, in the desired adjusted position, by means of a suitable set screw (not shown).

The aforesaid members 8, 8a, 8b and 8c thus form a chute or holder which has no bottom.

Figure 11:
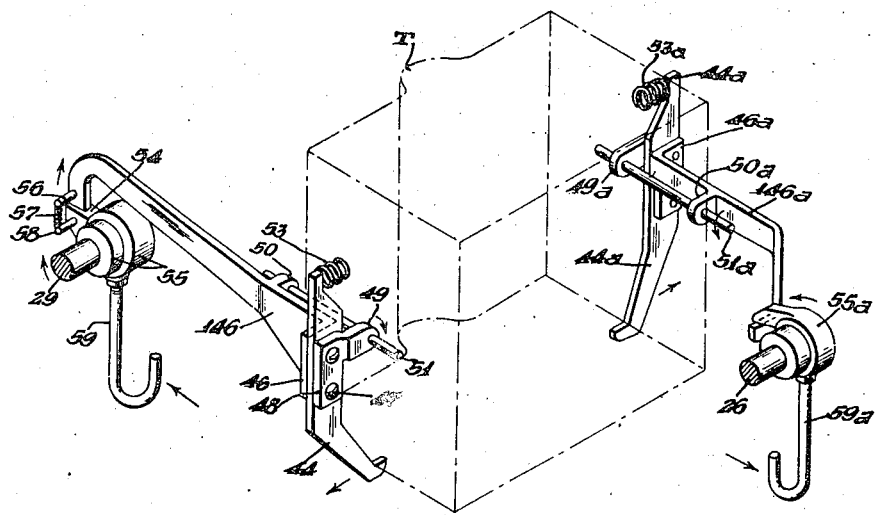
Fig. 11 is a diagrammatic perspective view of the fingers which releasably support the pack of labels at the bottom thereof. It also shows the essential mechanism which is associated with said fingers.

Referring to Fig. 11, the stack of labels is supported at its bottom by means of fingers 44 and 44a. These supporting fingers are identical and they are operated by identical mechanisms. The finger 44 is clamped between an angular plate 46 and a second plate 48, by means of screws 47. Plate 46 has an arm 146 and plate 48 has an arm 49. The arm 146 is integral with a bearing 50. A pivot pin 51 is located in the bearing 50 and in the bore of the arm 49.

As shown in Fig. 7, this pin 51 is supported in bearings 52 of the pivoted arm 41.

Figure 12:
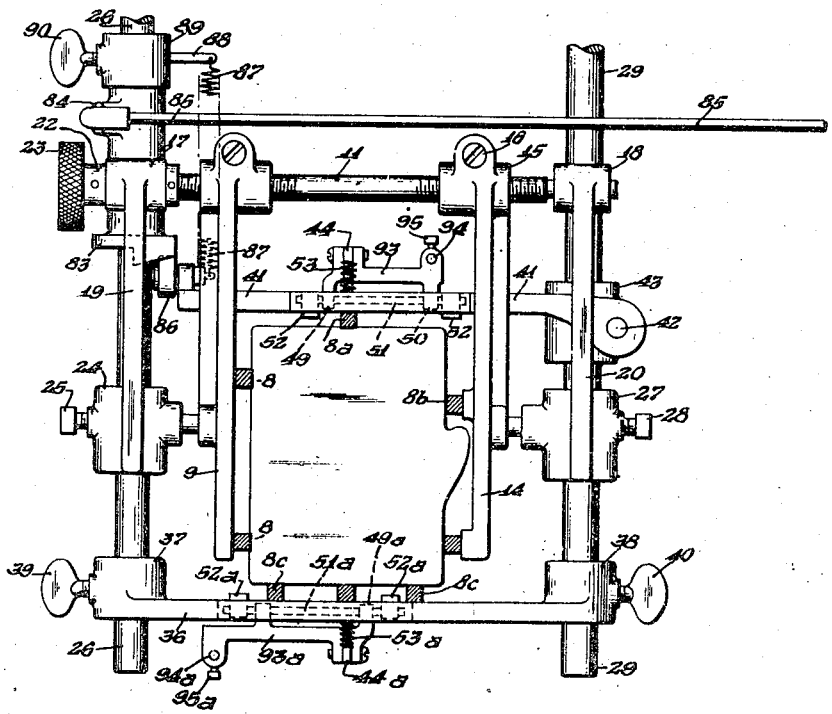
Fig. 12 is a plan view, partially in section, on the line 12—12 of Fig. 13.

One end of the helical compression spring 53 abuts the upper end of the finger 44. The other end of said spring 53 abuts the rod 41, as shown in Figs. 6, 7 and 12.

Referring to Fig. 11, one end of the arm 146 abuts the nose 54 of a collar 55 which is mounted turnably on the rod 29. The arm 146 has a pin 56 which is connected by means of a tension spring 57, to the pin 58 of the nose 54.

One end of a hook-shaped rod 59 is connected to the collar 55. At the proper time, the rod 59 is moved by one of the pickers, so as to turn the hub 55 on the rod 29, thus raising the nose 54.

As shown in Fig. 7, the arm 146 is inclined to the rod 29, and said arm is offset relative to arm 41. Therefore, when the free end of the arm 146 is raised by the nose 54, the finger 44 is turned relative to the axis of the pivot pin 51, thus releasing the bottom of the stack of labels.

The spring 53a corresponds to the spring 53, the arm 146a corresponds to the arm 146, etc.

The mechanism for operating the pickers is old and well-known per se, so that these parts are not illustrated in the drawings.

Generally speaking, there are two pickers which substantially abut each other when said pickers are applied to the bottom label of the stack. The pickers are moved laterally away from each other before they are moved away from the pack and while said pickers remain in sliding contact with the bottom label of the pack.

The laterally separated pickers are then moved in unison away from the pack while said pickers partially contact with the bottom label, so as to withdraw the bottom label. While the pickers are thus maintained laterally separated, they are moved in unison towards the bottle or other container, in order to apply the label to the bottle or container. Adhesive is applied to the transfer or operating faces of the pickers while they abut each other and before the pickers are placed against the bottom label of the pack.

Figure 10:
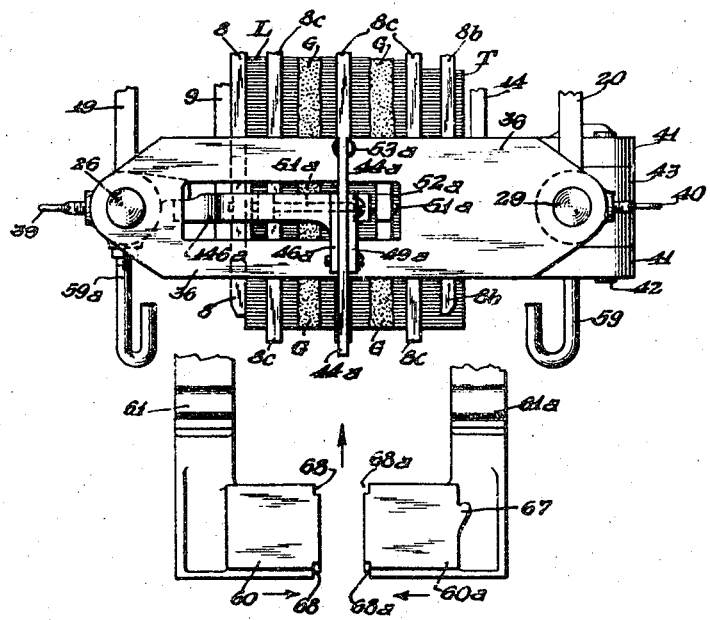
Fig. 10 is an end view on the line 10—10 of Fig. 6.

Fig. 10 shows the pickers 60 and 60a when they are separated laterally from each other. The full-line position of the pickers which is shown in Fig. 6, shows the pickers spaced from the pack of labels. The upper broken-line position of the pickers shows them contacting with the bottom label of the pack. The lower or right-hand broken-line position of the pickers shows them applying the label to the bottle B.

The pickers 60 and 60a are respectively connected to arms 61 and 61a.

As shown in Fig. 6, the arm 61a is mounted turnably upon a rod or shaft 62. Fig. 6 shows the rolls 63 and 64 by means of which adhesive is applied to the full transfer faces of the pickers. The transfer roll 64 is connected to the arm 65, which is connected to the shaft 66 in the usual manner.

The mechanism for applying glue or other adhesive to the pickers is wholly conventional. As the pickers are swung upwardly towards the pack of labels, the roll 64 is actuated so as to apply the adhesive over the entire transfer surfaces of the pickers. The picker 60a has an extension 67 which corresponds to the tab T of the label. The adhesive-receiving faces of the pickers are raised above the other parts of said pickers, in order to limit the application of the adhesive. This is also conventional.

Figure 9:
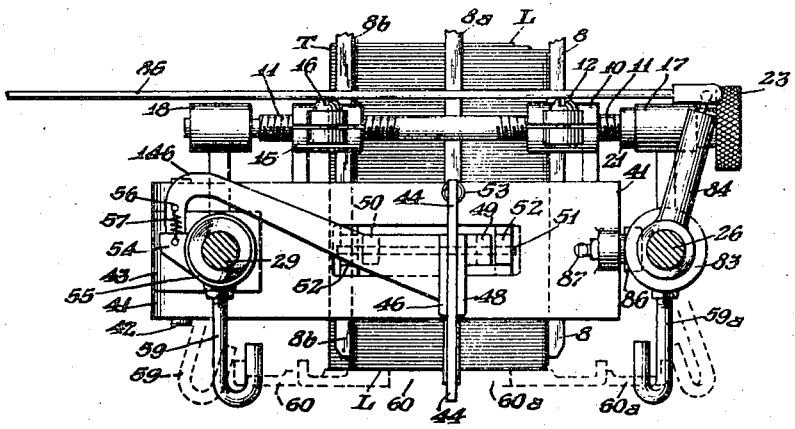
Fig. 9 is a sectional view on the line 9—9 of Fig. 6.

Referring to Fig. 9, when the pickers contact with the bottom label, said pickers abut each other at their adjacent edges, so that the pickers pass between the hook ends of the members 59 and 59a, without actuating said members 59 and 59a. After the pickers contact with the bottom label of the stack, said pickers are moved laterally away from each other, thus moving the members 59 and 59a from the full-line positions which are shown in Fig. 9, to the broken-line positions shown in Fig. 9. The collars 55 and 55a are thus turned, thus moving the fingers 44 and 44a away from their operative positions, so that said fingers 44 and 44a wholly release the pack of labels, which then rests upon the faces of the pickers to which the adhesive has been applied.

When the pickers are thus moved laterally away from each other, their adhesive is distributed evenly over the entire face of the bottom label, save for the small areas of the bottom label which contacted with the fingers 44 and 44a.

As shown in Fig. 10, the picker 60 is provided with notches 68, and the picker 60a is provided with notches 68a. The fingers 44 and 44a are located in said notches when the pickers are moved to make their initial contact with the bottom label of the stack. The notches are then arranged in pairs, each notch 68 being associated with a notch 68a.

When the label is applied to the bottle or other container by the pickers, the pickers are held stationary, and a stripper finger 69 is then moved between the laterally separated pickers so as to strip the label from the pickers, when the pickers are moved away from the bottle. The stripper finger 69 is pivotally connected at 70 in the usual manner, to the usual arm 71.

Figure 3:
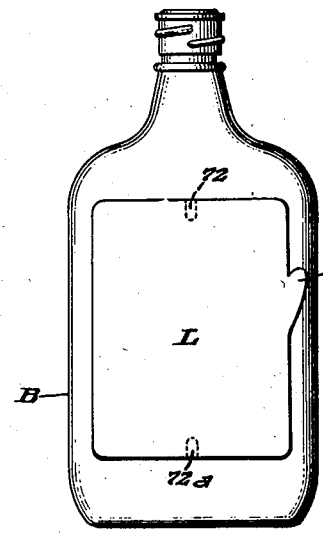
Fig. 3 is an elevation which shows how a label has been applied to a bottle or other container, according to the invention. The areas indicated in broken lines are free from adhesive and the remainder of the inner surface of the label is covered with adhesive.

Referring to Fig. 3, the areas 72 and 72a correspond to the pairs of notches 68 and 68a which receive the fingers 44 and 44a.

Therefore, the label does not have any adhesive at the areas 72 and 72a, but adhesive is fully applied to the vertical edges of the label, and to the remainder of the area of the label.

Figure 4:
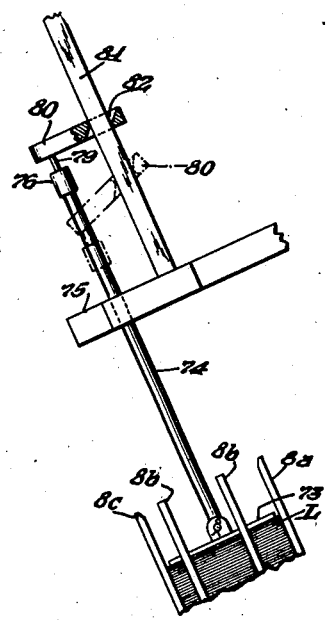
Fig. 4 is a detail elevation showing the upper part of the holder which is used for holding the pack of labels in the labeling machine.

Referring to Fig. 4, the follower plate 73 is pivotally connected to the rod 74, which reciprocates in a guide bore of the plate 75, which is connected to the frame F.

Figure 5:
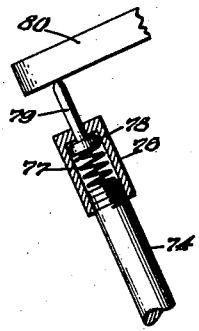
Fig. 5 is an enlarged detail elevation, partially in section, showing the plunger for maintaining the pack of labels under pressure, in the labeling machine.

As shown in Fig. 5, the upper end of the rod 74 is threaded to a cup-shaped bushing 76. A compression spring 77 is located in said bushing 76. The upper end of the spring 77 abuts the head 78 of a pin 79 which extends through a guide bore in the end wall of the bushing 76.

A plate 80 is slidably mounted on a rod 81, which is connected to the plate 75. The rod 81 preferably has a square or other non-circular cross-section. The plate 80 is provided with a bore 82 which has the same cross-section as the rod 81. The axis of the bore 82 is inclined to the longitudinal axis of the rod 81.

The tilting of the plate 80 relative to the rod 81 is thus limited. As the labels are removed one by one, the weight of the plate 80 causes the same to tilt and to slide downwardly on rod 81, as shown in broken lines in Fig. 4, so that the plate 80 always exerts pressure against the pin 79, and through the compression spring 77, against the rod 74.

Means are provided for holding the pack of labels at the upstanding walls of said pack, when the fingers 44 and 44a are moved so as to release the pack.

Figure 8:
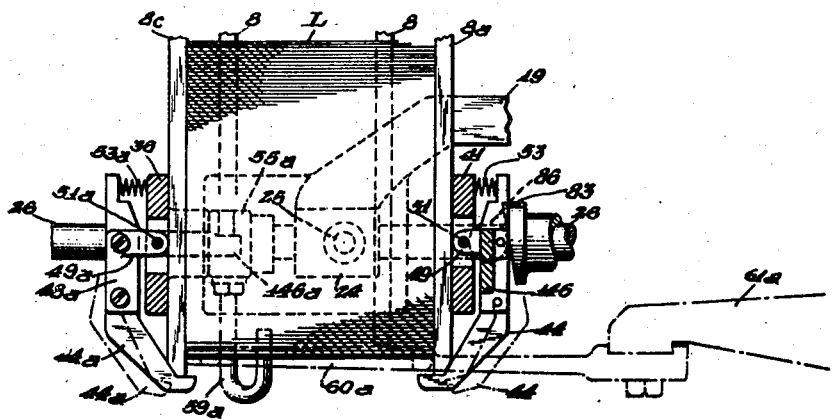
Fig. 8 is a sectional view on the line 8—8 of Fig. 7.

As shown in Fig. 8, a cam 83 is mounted for limited turning movement on the rod 26. As shown in Figs. 6 and 7, the hub of this cam 83 has a radial projection 84, to which a pull rod 85 is pivotally connected.

When the fingers 44 and 44a are moved to the release position, the rod 85 is automatically pulled so as to turn the cam 83. This cam 83 operates in combination with the usual cam roll 86, which is pivoted in a bearing of the arm 41.

Therefore, as the fingers 44 and 44a release the pack of labels, the arm 41 is automatically turned on its pivot 42, in order to press the bar 8a against the corresponding upstanding wall of the pack of labels, so that the pack of labels is clamped between the bar 8a and the opposite bars 8c.

One end of a tension spring 87 is connected to the pin 88 of a collar 89, which is adjustably clamped to the rod 26 by means of a set screw 90. The other end of the spring 87 is connected to the bearing of the shaft of the cam roll 86, so that the cam roll 86 is maintained continuously in contact with the cam surface of the cam 83.

Figure 13:
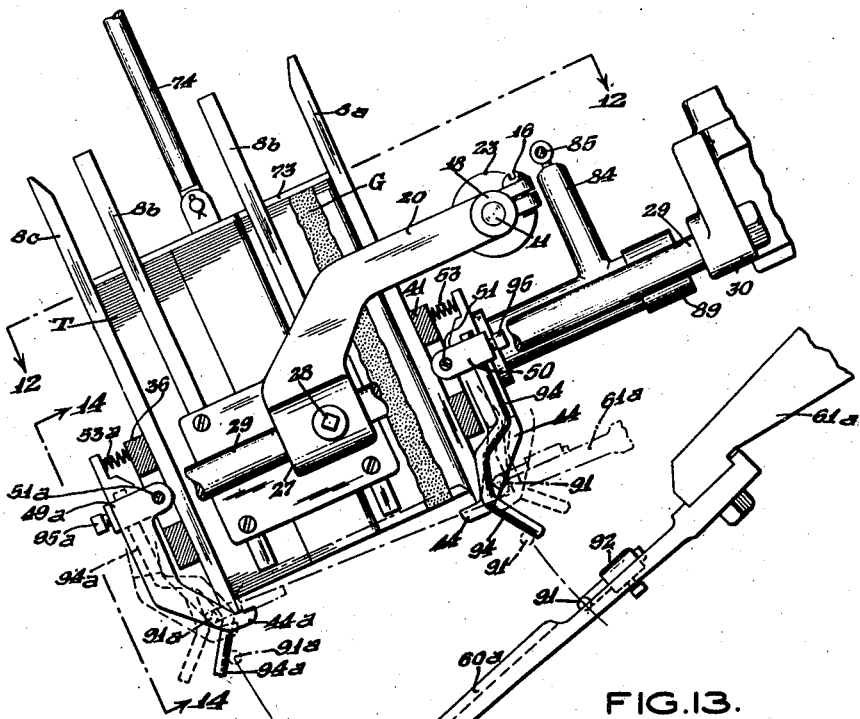
Fig. 13 is a view generally similar to Fig. 6, showing a modification of the invention.
Figure 14:
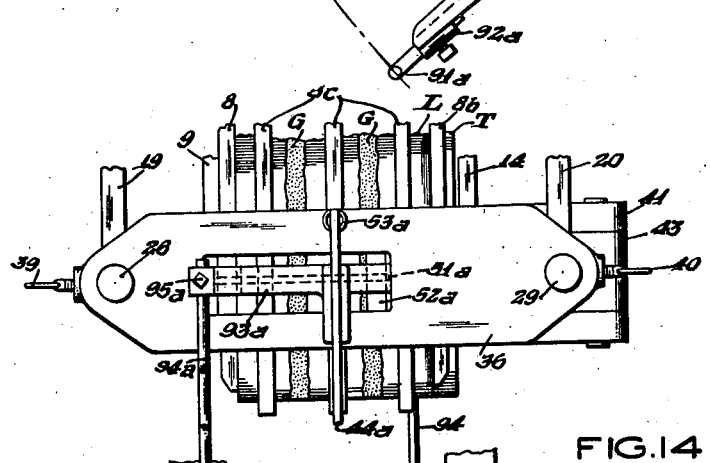
Fig. 14 is an elevation taken on the line 14—14 of Fig. 13.

In the second embodiment which is shown in Figs. 12-14, and as shown in Fig. 14, the picker 60 has an extension 92a in which an angular rod 91a is rigidly held. The arm of the picker 60a has an extension 92, in which an angular rod 91 is rigidly held.

As shown in Fig. 12, rods 93 and 93a are respectively clamped to the fingers 44 and 44a. Control rods 94 and 94a are respectively adjustably clamped in bores of the rods 93 and 93a, by means of set screws 95 and 95a.

These control rods 94 and 94a have the bent or angular shape which is shown in Fig. 13.

When the pickers move into contact with the bottom label of the pack, and before the abutting pickers are laterally separated, the members 91 and 91a will respectively contact with the members 94 and 94a, thus releasing the fingers 44 and 44a, so that the pickers contact fully with the entire face of the bottom label. According to the second embodiment, the adhesive is therefore applied over the entire face of the label, including the areas 72 and 72a. In the second embodiment it is therefore unnecessary to provide slots or notches in the pickers, for accommodating the fingers 44 and 44a.

In the first embodiment, arm 41 is operated to clamp the stack of labels at two opposed upstanding walls, just as the pickers are moved laterally apart. The pull-rod 85 is connected to the same mechanism which moves the pickers laterally away from each other.

In the second embodiment, the picker-operating mechanism operates pull-rod 85 in order to clamp the stack of labels as the pickers move the fingers 44 and 44a to their inoperative position. In each embodiment, the bottom label of the stack is always allowed to move to the same predetermined inclined plane, so that the pickers always contact with a bottom label which is in said predetermined position.

The fingers 44 and 44a, when they return to operative position, always support the pack of labels with its bottom label in predetermined position, even though the height of the pack decreases.

The mechanism for operating the pickers is well-known and conventional per se.

The adhesive which I prefer to use, because of its flexibility, is latex or a latex composition, such as "National" adhesive No. 9005A. This latex or latex composition may be or may not be prevulcanized. It is used in the form of a thick liquid, which dries at ordinary temperature of about 70° F. When it dries, it forms a very thin and flexible film, which can be stripped if desired, from the pack of labels, thus leaving the labels in their original unconnected condition, free from any marks. This type of adhesive will not disintegrate under the impact of the pickers.

The drawings show my invention applied to a well known commercial type of labeling machine, which is known as the "Economic" type.

For example, the invention shows numerous available sub-combinations which need not be operative per se and which can be used in connection with various types of machines.

It will be noted that the holding fingers 44 and 44a are normally biased to their operative positions by means of the springs 53 and 53a.

The holding means which include the movable bar 8a clamp or grip the stack of labels along its entire height, so that the stack of labels is gripped above the bottom label. Said holding means are normally biased to inoperative position by means of the spring 87.

I have shown preferred embodiments of my invention but it is clear that numerous changes and omissions can be made without departing from its spirit.

I claim:

1. In a labeling machine, a chute adapted to hold a stack of labels, movable holding fingers associated with said chute and adapted to support the stack of labels at the bottom of said stack when said holding fingers are in operative position, said fingers being movable to an inoperative position in which they release the stack, a pair of pickers, means adapted to supply adhesive to the transfer faces of the pickers, said pickers being laterally movable towards each other and away from each other and being also movable in unison towards said chute and away from said chute, means adapted to move said pickers towards said chute to contact with the bottom label of the stack while the pickers are in predetermined lateral relation and then to move the pickers laterally away from each other while the pickers slidably contact with the bottom label of the stack and then to move the laterally separated pickers away from the chute with the bottom label of the stack adhering to said transfer faces, control means adapted to move said holding fingers to inoperative position when the pickers are moved laterally away from each other.

2. In a labeling machine, a chute which is adapted to slidably hold a stack of labels which are detachably connected to each other, first movable holding means adapted to support the stack of labels in said chute at the bottom of said stack when said holding means are in operative position, said holding means being movable to inoperative position in which the stack is released, second movable holding means adapted to laterally clamp the stack of labels above the bottom of said stack so as to hold the stack in fixed relation to the chute when said second holding means are in operative position, picker means movable towards said chute and away from said chute, means adapted to supply adhesive to said picker means, said picker means being adapted to contact with and to remove the bottom label of said stack against the force of said label-holding means, control means adapted to move the first holding means to inoperative position while the picker means are in position to support the stack of labels and to move the second holding means to operative clamping position while the first holding means are in inoperative position, the first holding means being biased to normal operative position, the second holding means being movable to an inoperative position and being biased to normal inoperative position.

3. In a labeling machine, a chute adapted to hold a stack of labels, first movable holding means adapted to support said stack at the bottom thereof, second movable holding means adapted to grip the stack above the bottom label thereof, picker means movable towards the bottom label of the stack and away from said bottom label, control means adapted to move the first holding means into inoperative position and wholly spaced from said bottom label and adapted to substantially simultaneously move the second holding means into operative position during the movement of said picker means towards said bottom label, said control means being adapted to maintain said first holding means in said inoperative position when the picker means contact with said bottom label.

4. In a labeling machine, a chute adapted to hold a stack of labels, first movable holding means adapted to support said stack at the bottom thereof, second movable holding means adapted to grip the stack above the bottom label thereof, picker means movable towards the bottom label of the stack and away from said bottom label, control means adapted to move the first holding means into inoperative position and wholly spaced from said bottom label and adapted to substantially simultaneously move the second holding means into operative position during the movement of said picker means towards said bottom label, said control means being adapted to maintain said first holding means in said inoperative position when the picker means contact with said bottom label, said picker means being shaped to apply adhesive to substantially the entire exposed face of said bottom label.

5. In a labeling machine, a chute adapted to hold a stack of labels which are detachably connected to each other, picker means movable towards said bottom label of said stack and away therefrom, said picker means being shaped to apply adhesive continuously to the bottom label continuously along two opposed edges of said bottom label, said opposed edges being the vertical edges of said label when said label is applied to a container, movable holding means adapted to laterally clamp the stack of labels at the other opposed edges of said bottom label so as to hold the stack fixed relative to the chute, control means adapted to move said holding means to inoperative position, and wholly spaced from the stack of labels, while the picker means contact with the bottom label.

SIDNEY T. CARTER.